(No Model.)
J. J. TOWER.
POLICE NIPPERS.
No. 276,307.                    Patented Apr. 24, 1883.
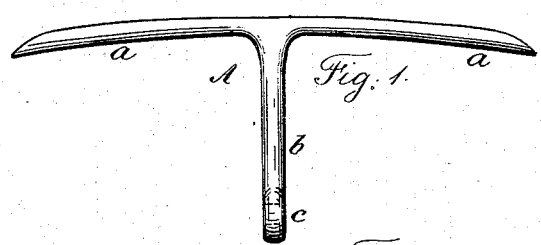
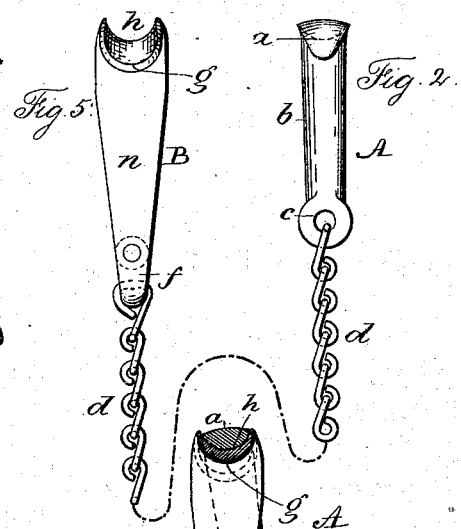
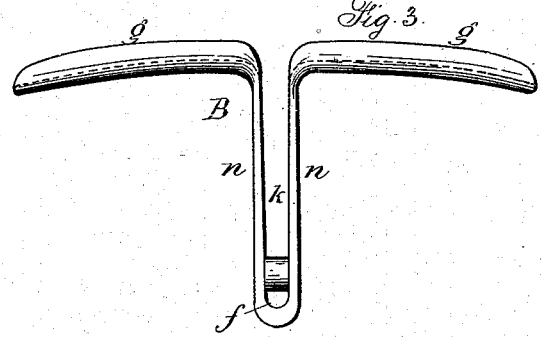
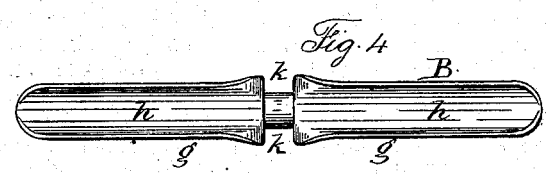
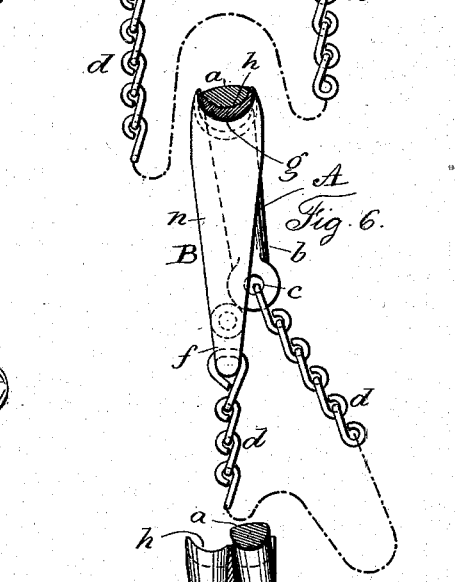
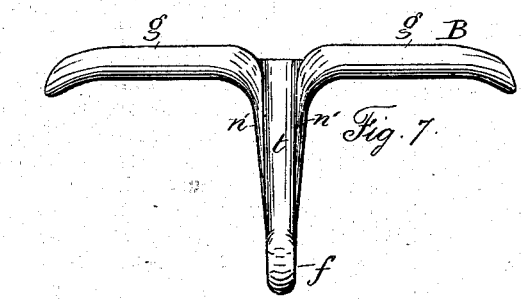
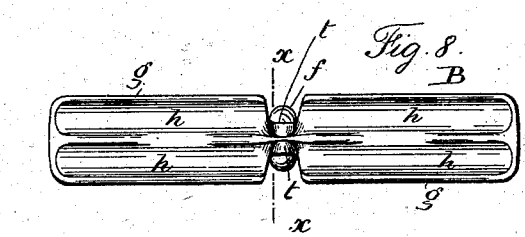
Witnesses
J. Haib
Chas H. Smith
Inventor
John J. Tower
per              atty

UNITED STATES PATENT OFFICE.

JOHN J. TOWER, OF BROOKLYN, NEW YORK.

POLICE-NIPPERS.

SPECIFICATION forming part of Letters Patent No. 276,307, dated April 24, 1883.

Application filed January 19, 1883. (No model.)

*To all whom it may concern:*

Be it known that I, JOHN J. TOWER, of Brooklyn, in the county of Kings and State of New York, have invented an Improvement in Police-Nippers, of which the following is a specification.

In Letters Patent No. 152,822 nippers for police officers are shown in which T-handles are united by a chain, so that when the chain is thrown around the prisoner's arm or leg and both handles grasped the limb is securely held. The handles, however, are separate, and the officer has to hold both handles firmly to prevent them slipping out of the hand.

I have heretofore made the police-nippers with one handle as a trough or recess to receive the other handle and prevent one handle slipping away from the other in the struggles of the prisoner; but the same was not fully satisfactory to me, because the two handles could only interlock from one side; hence in the efforts to secure the prisoner the attention of the officer was partially distracted to the properly placing of the grooved handle in the hand and to causing the handles to interlock. I have pursued the subject, and finally succeeded in constructing the nipper-handles so that they will interlock when brought together in either way, and the chain can be thrown around the prisoner's limb and the handles interlocked without regard to the direction in which the handles come together.

In the drawings, Figure 1 is an elevation of the solid T-shaped handle. Fig. 2 is an end view of the same. Fig. 3 is an elevation of the hollow or grooved handle. Fig. 4 is a plan, and Fig. 5 an end view, of the same. Fig. 6 is a section of the two handles as interlocked. Fig. 7 is an elevation, and Fig. 8 a plan, of a modification of the concave handle made double; and Fig. 9 is a section of the parts at the line *x x*.

The single or T-handle A is made with the cross-head *a* and stem *b*, with an eye *c*, to which one end of the chain *d* is attached, similar to the devices that I have heretofore made use of.

The grooved handle B is made so that it will receive the handle A when placed against it from either side. I prefer the form represented in Figs. 3, 4, 5, and 6, although the same may be double, as seen in Figs. 7, 8, 9.

The eye *f* is at the lower end of the open shank, and the groove *h*, for the reception of the T-head *a*, is in the upper surface of the handle *g*, and there is an opening at *k* in the shank, between the straps *n*, into which the stem *b* of the handle A passes. The handle A is passed from either side and interlocked with the handle B, the head *a* passing into the groove *h* and the stem *b* in between the straps *n*.

When the shank of the handle B is open, as seen in Figs. 3 and 4, it is preferable to make use of steel forged into the shape shown, with a washer or web between the straps *n* to prevent the chain from slipping out of its place, and to strengthen the parts. Where there is a solid central portion, *t*, between the grooves, with wings *n'* at each side, as seen in Figs. 7, 8, 9, the upper part of the handle is to be made with two grooves in its surface, as shown, so that the head *a* will be received either in one groove or the other, according to which side the handle A may be entered.

I claim as my invention—

1. The combination, with the T-shaped handle A and the attached nipper-chain, of the handle B, to which the other end of the chain is attached, said handle B having a grooved upper surface, and wings or straps, between which the stem of the handle A is received, at either side, substantially as set forth.

2. The police-nipper having a handle, B, formed with straps *n*, and the grooved handle portions, in combination with the handle A, substantially as set forth.

Signed by me this 17th day of January, A. D. 1883.

JOHN J. TOWER.

Witnesses:
 GEO. T. PINCKNEY,
 HAROLD SERRELL.